July 5, 1960
V. SUSSMAN
2,943,359
METHOD OF ENCAPSULATING ELECTRONIC
COMPONENTS OR OTHER ELEMENTS
Filed April 10, 1957
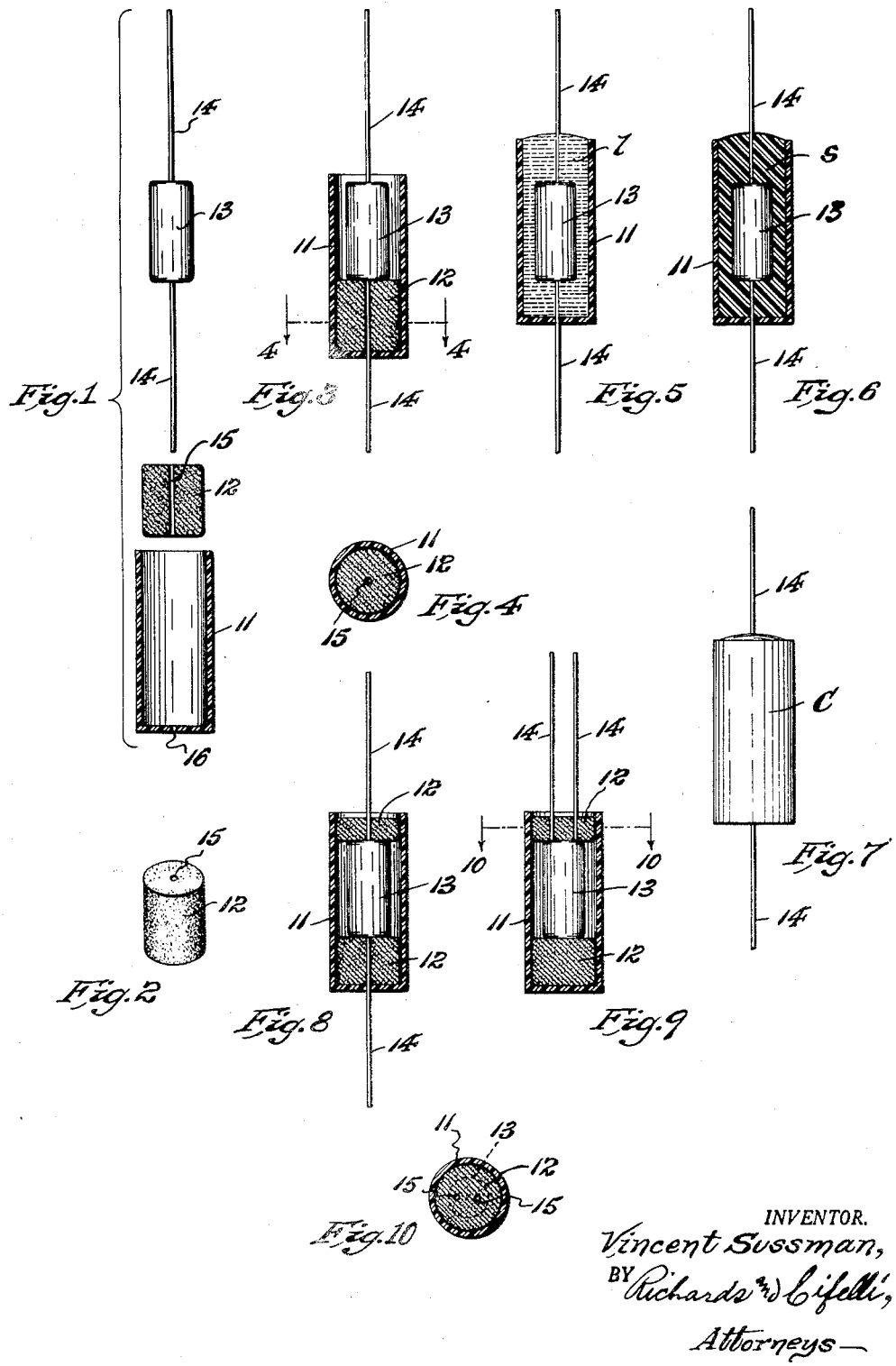
INVENTOR.
Vincent Sussman,
BY Richards and Cifelli,
Attorneys

United States Patent Office 2,943,359
Patented July 5, 1960

2,943,359

METHOD OF ENCAPSULATING ELECTRONIC COMPONENTS OR OTHER ELEMENTS

Vincent Sussman, Brooklyn, N.Y., assignor to Joseph Waldman & Sons, Irvington, N.J.

Filed Apr. 10, 1957, Ser. No. 651,965

9 Claims. (Cl. 18—59)

This invention relates to an improved method of encapsulating electronic components, such as resistors, coils, transformers, capacitors or the like, or other elements desired to be hermetically enclosed, and especially electronic components of small size or so called miniature type, whereby to seal the same against contact by the atmosphere or by moisture.

In my copending patent application Serial No. 638,525 I have disclosed a method of encapsulating electronic components and the like which has been found to provide a more satisfactory and expeditious procedure for the purpose than that heretofore generally practiced. The present invention relates to a further improved method which expedites the encapsulating process, and which produces a homogeneous rigid encapsulation surrounding and embedding the component desired to be hermetically sealed in the enclosure provided thereby, which enclosure possesses the desirable characteristics of that disclosed in my aforesaid copending patent application.

This invention has for an object to provide a method of encapsulating electronic components or other elements in a suitable thermosetting resin or plastic which avoids necessity of casting or pouring a preprepared liquefied resin or plastic compound during the encapsulating procedure, but instead provides that part of the resin or plastic compound which would otherwise be cast, in an initially dry and solid condition comprising a preformed mass of a compressed uncured mixture of powdered resin or plastic and hardening or curing agent, thereby expediting the handling thereof during the encapsulating procedure, and avoiding waste. To this end, the present invention provides an encapsulating method which broadly comprises:

(1) The provision of upwardly open external shells or cups made from a suitable thermosetting resin or plastic;

(2) The provision of preformed bodies of a compressed uncured powdered resin or plastic combined with a suitable hardening or curing agent, said bodies being adapted to be associated with the components to be encapsulated for insertion within the external shells or cups, and being of such predetermined size, shape and mass that, when liquefied, the same will fill the interiors of said shells or cups in encompassing relation to the components within the latter;

(3) Subjecting the component and resin or plastic preform containing shells or cups to heat of that degree which will first liquefy the preform to cause it to flow around the component within a shell or cup in encompassing relation thereto, and so as to fill therewith the shell or cup interior, and thereupon, under continued influence of applied heat, to harden into a solid condition, whereby to form with the shell a unitary encapsulation of the component.

This invention has for a further object to produce the external shells or cups from a partially cured resin of the epoxy group, and the preform bodies from the same resin in compressed powdered condition including, in mixture therewith, a suitable curing or hardening agent, whereby said compressed preform body, when liquefied during the encapsulating procedure, and subsequently solidified, will intimately adhere to an electronic component enveloped thereby, and will chemically combine with the partially cured shells or cups so as to provide, in combination therewith, a homogeneous sealing body mass in enveloping and encapsulating relation to the electronic component embedded therein.

This invention has for another object to provide the preformed bodies of compressed resin and hardening or curing agent compound with one or more openings therethrough for the extension of electronic component leads therethrough, when assembling the same with said components.

The above and other objects will be understood from a reading of the following detailed description of this invention in connection with the accompanying drawings, in which:

Fig. 1 is an elevational view, with parts in section, showing the elements which make up an encapsulated electronic component ready to be assembled together preparatory to encapsulation procedure; Fig. 2 is a perspective view of a preform body of resin and curing or hardening agent compound; Fig. 3 is a sectional view in part elevation of the elements as assembled together ready to carry on further steps of the encapsulation procedure; Fig. 4 is a cross-sectional view, taken on line 4—4 in Fig. 3; Fig. 5 is a sectional view similar to that of Fig. 3 but showing the envelopment of the electronic component by liquefication of the preform body of the resin and curing or hardening agent compound; Fig. 6 is a similar view showing the liquefied preform body resin after it has solidified within the external shell or cup in encompassing relation to the contained electronic component; and Fig. 7 is a side elevational view of the finished encapsulated electronic component.

Fig. 8 is a sectional view similar to that of Fig. 3, but showing modified forms and arrangement of preform bodies of resin and curing or hardening agent compound; Fig. 9 is a similar view showing further modified forms of the resin preform bodies; and Fig. 10 is a cross-sectional view taken on line 10—10 in Fig. 9.

In the production of encapsulated electronic components according to the method of the instant invention, upwardly open shells or cups 11 of suitable size and shape (usually cylindrical) are produced from a selected thermosetting resin or plastic substance, such as epoxy compounds, polyester, alkyds or phenolics. Preferably however the most desirable resin or plastic is that of the epoxy group.

In the preferred practice of the method of this invention, and especially when the shells or cups 11 are produced from a resin or plastic of the epoxy group, it is desirable that the forming resin or plastic be but partially cured, for reasons hereinafter more fully explained.

As another step in the method of this invention, uncured powdered resin, preferably powdered epoxy compound including a suitable curing or hardening agent, is compressed into a solid body mass of predetermined size and shape, thus providing what, for convenience of description, will be hereinafter referred to as resin preforms 12.

The electronic components 13 to be encapsulated are provided with leads 14. To accommodate said leads 14, the resin preforms 12 are provided with one or more suitably disposed openings or passages 15 through which said leads 14 can extend. When the leads 14 extend respectively from opposite ends of an electronic component, the closed bottom end of a component receiving shell or cup 11 is provided with an opening 16 through which the downwardly extending lead can project from the bottom of the shell or cup, while the upwardly extending lead can project exteriorly from the upper end of the shell or cup.

When entering an electronic component 13 in a shell or cup 11, a resin preform 12 is associated therewith in end to end relation thereto, and ordinarily so that said preform 12 will be disposed in the bottom interior of the shell or cup. If the electronic component 13 possesses a downwardly extending lead 14, the resin preform 12 can be threaded thereon by passing said lead through an opening or passage 15 with which, in such case, the preform will be provided (see Fig. 3).

The quantitative mass of the resin preforms 12 is so predetermined that, when the same are entered with the associated electronic components 13 within the interiors of shells or cups 11, upon liquefication of the preform, the resulting liquid will submerge and encompass the electronic components, and will fill the interiors of the shells or cups 11.

An electronic component 13 with an associated resin preform 12 having been entered in a shell or cup 11 as hereinabove set forth, the assembly is submitted to application thereto of heat which will first liquefy the preform so as to submerge and surround the electronic component therein, and so that the liquefied resin 1 will entirely fill the void between the electronic component and the walls of the shell or cup 11 (see Fig. 5). During such initial preform liquefication phase of heat application, it may be desirable to apply gentle pressure to the electronic component whereby to squeeze the liquefied resin upwardly through the interior of the shell or cup 11, and around the electronic component between the same and the walls of the shell or cup, so as to also assure desirable location of the electronic component intermediate the ends of the shell or cup.

The degree of heat required, when the resin preform 12 comprises the epoxy compound, is of the order of 250° F. to 350° F., and may be applied by depositing the assemblies in a suitable oven, or by subjecting the assemblies to dielectric or infra-red rays. As the heat is applied to the assemblies, the first effect is to liquefy the resin preforms, as above stated, whereupon continued application of the heat cures and hardens the resin, whereby to convert it from the initial liquid state to a set solidified state S, the solid mass of which adheres to the electronic component 13 embedded therein and to the shell or cup 11 (see Fig. 6) thus forming a finished encapsulated electronic component C (see Fig. 7).

It may be here pointed out that a plurality of the shells or cups 11, of suitable number, may be formed in connection with a common support, similarly as disclosed my aforesaid copending patent application Serial No. 638,525; from which support the same may be broken away after the assemblies have been treated to form the encapsulated electronic components by the method of the instant invention.

Under preferred practice of the method according to the instant invention, the shells or cups 11 are composed of a partially cured epoxy resin compound, and the preforms 12 of uncured epoxy resin compound. As a consequence of this, when the preform 12 is liquefied so as to fill a shell or cup 11 in surrounding relation to the contained electronic component 13, it also contacts the walls of the shell or cup, and since the latter is but partially cured, as the subsequent curing and hardening of the preform resin and shell or cup ensues under application of heat, the preform resin will react chemically with that of the shell or cup so as to unite therewith, thereby to produce an integral homogeneous sealing body mass in total enveloping relation to the electronic component.

As shown in Figs. 3 and 9, two preforms 12 may be utilized in the assembly thereof with a shell or cup 11 and an electronic component 13, whereby to locate one preform at the lower end of the inserted electronic component and the other preform at the upper end of the latter; these preforms are so sized and of such respective predetermined quantitative mass that, when both are liquefied, the resultant liquid will be of that quantity which is calculated to fill a shell or cup in submerging and encompassing relation to an associated electronic component contained in the latter.

As shown in Figs. 9 and 10, selected preforms 12 may be provided with a plurality of openings or passages 15 to accommodate a corresponding plurality of leads 14 of an associated electronic component.

A marked advantage of the method of the instant invention is that the quantitative mass of the preforms 12 can be predetermined in advance of use, and so calculated as to furnished the exact amount of uncured resin which, when liquefied, will submerge a given size of electronic component and fill a given size of shell or cup in which the latter is deposited. Such preforms can be made up in quantity in advance of use, and thereafter can be conveniently and rapidly handled by operators employed to make up assemblies thereof with the shells or cups and electronic components ready for heat treatment. This makes for economical mass production of the encapsulated electronic components. Also, by reason of this, the assembling operators are not required to handle uncured resins in liquid state. Furthermore, since liquid epoxy resin compounds including a hardening agent have but limited pot life, there is hazard of waste in the use thereof which is avoided by the provision of the uncured resin in a preformed solid condition according to this invention.

Having now described my invention, I claim:

1. A method of encapsulating a component having a lead extending therefrom, said method comprising providing a shell molded of a thermosetting resin composition, said shell being open at one end and having an end wall at the opposite end, the internal dimensions of the shell being greater than the corresponding dimensions of the component to be encapsulated to permit the component to be fully contained in the shell and spaced from the shell wall, providing a solid preform of a thermosetting resin composition liquefiable and curable upon the application of heat alone, positioning the component and the preform in the shell so that the preform is located between said end wall and the component, heating the preform to cause it to liquefy and flow into the space between the shell and the component to encapsulate the component and cure, the liquefaction and curing of the resin supplied by the preform being accomplished in the absence of molding pressure.

2. A method of encapsulating a component as set forth in claim 1, wherein the shell is of an epoxy resin composition and the preform is of an epoxy resin composition.

3. A method of encapsulating a component as set forth in claim 1, wherein the shell is of an epoxy resin composition and is initially in a partially cured state and the preform is of an epoxy resin composition of a predetermined amount, the shell being cured and substantially filled with the contained component and the resin supplied by the preform upon heating the assembly.

4. A method of encapsulating a component having a lead extending therefrom, said method comprising providing a shell molded of a thermosetting resin composition, said shell being open at one end and having an end wall at the opposite end, an opening in said end wall for the positioning of said lead therethrough, the internal dimensions of the shell being greater than the corresponding dimensions of the component to be encapsulated to permit the component to be fully contained in the shell and spaced from the shell wall, providing a solid preform of a thermosetting resin composition liquefiable and curable upon the application of heat alone, said preform having a passage to allow said lead to extend therethrough, positioning the component and the preform in the shell so that the preform is located between said end wall and the component, the lead extending through said preform passage and through said end wall opening, heating the preform to cause it to liquefy and flow into the space between the shell and the component to encapsulate the component and cure, the liquefaction and curing of the resin supplied by the preform being accomplished in the absence of molding pressure.

5. A method of encapsulating a component as set forth in claim 4, wherein the shell is of an epoxy resin composition and the preform is of an epoxy resin composition.

6. A method of encapsulating a component as set forth in claim 4, wherein the shell is of an epoxy resin composition and is initially in a partially cured state and the preform is of an epoxy resin composition of a predetermined amount, the shell being cured and substantially filled with the contained component and the resin supplied by the preform upon heating the assembly.

7. A method of encapsulating a component having a lead extending therefrom, said method comprising providing a shell molded of a thermosetting resin composition, said shell being open at one end and having an end wall at the opposite end, the internal dimensions of the shell being greater than the corresponding dimensions of the component to be encapsulated to permit the component to be fully contained in the shell and spaced from the shell wall, providing a pair of solid preforms of a thermosetting resin composition liquefiable and curable upon the application of heat alone, at least one of the preforms having a passage to allow said lead to extend therethrough, positioning the component and the preforms in the shell so that the component is between the preforms with one of the preforms located between said end wall and the component, the lead extending through said preform passage and to the exterior of the shell, heating the preforms to cause them to liquefy and flow into the space between the shell and the component to encapsulate the component and cure, the liquefaction and curing of the resin supplied by the preforms being accomplished in the absence of molding pressure.

8. A method of encapsulating a component as set forth in claim 7, wherein the shell is of an epoxy resin composition and the preforms are of an epoxy resin composition.

9. A method of encapsulating a component as set forth in claim 7, wherein the shell is of an epoxy resin composition and is initially in a partially cured state and the preforms are of an epoxy resin composition of predetermined amount, the shell being cured and substantially filled with the contained component and the resin supplied by the preforms upon heating the assembly.

References Cited in the file of this patent

UNITED STATES PATENTS

| | | |
|---|---|---|
| 1,763,115 | Wermine | June 10, 1930 |
| 2,136,609 | Butterfield et al. | Nov. 15, 1938 |
| 2,158,044 | Haller | May 9, 1939 |
| 2,271,774 | Megow et al. | Feb. 3, 1942 |
| 2,527,373 | Parson | Oct. 24, 1950 |
| 2,674,646 | Schoch | Apr. 6, 1954 |
| 2,773,158 | Myers | Dec. 4, 1956 |
| 2,904,618 | Robinson et al. | Sept. 15, 1959 |